(12) United States Patent
Alemani et al.

(10) Patent No.: US 12,090,977 B2
(45) Date of Patent: Sep. 17, 2024

(54) METHOD AND DEVICE FOR DETECTING AND PROVIDING BRAKING ASSESSMENT INFORMATION, INDICATIVE OF A PARTICULATE EMISSION DUE TO THE USE OF A VEHICLE BRAKING SYSTEM

(71) Applicant: FRENI BREMBO S.p.A., Curno (IT)

(72) Inventors: Mattia Alemani, Curno (IT); Valerio Galizzi, Curno (IT); Guido Perricone, Curno (IT)

(73) Assignee: Brembo S.p.A., Bergamo (IT)

( * ) Notice: Subject to any disclaimer, the term of this patent is extended or adjusted under 35 U.S.C. 154(b) by 668 days.

(21) Appl. No.: 17/267,519

(22) PCT Filed: Aug. 7, 2019

(86) PCT No.: PCT/IB2019/056716
§ 371 (c)(1),
(2) Date: Feb. 10, 2021

(87) PCT Pub. No.: WO2020/031103
PCT Pub. Date: Feb. 13, 2020

(65) Prior Publication Data
US 2021/0316710 A1     Oct. 14, 2021

(30) Foreign Application Priority Data

Aug. 10, 2018   (IT) .................. 102018000008055

(51) Int. Cl.
*F16D 65/00* (2006.01)
*B60K 35/00* (2006.01)
(Continued)

(52) U.S. Cl.
CPC ............ *B60T 17/221* (2013.01); *B60K 35/00* (2013.01); *G06F 30/27* (2020.01); *H04W 4/40* (2018.02);
(Continued)

(58) Field of Classification Search
CPC .............. B60T 17/221; B60T 2230/00; B60T 2250/00; B60T 2250/04; B60T 2270/88;
(Continued)

(56) References Cited

U.S. PATENT DOCUMENTS 6,332,354 B1    12/2001  Lalor et al.
6,338,017 B1 *  1/2002  Kato .................... B60T 13/686
                                          701/79
(Continued)

FOREIGN PATENT DOCUMENTS

WO      2011133094 A1    10/2011
WO      2017097901 A1    6/2017

OTHER PUBLICATIONS

European Patent Office, International Search Report, issued in PCT/IB2019/056716, Nov. 20, 2019, Rijswijk, Netherlands.
(Continued)

*Primary Examiner* — Christopher P Schwartz
(74) *Attorney, Agent, or Firm* — Marshall & Melhorn, LLC

(57) ABSTRACT

A method and device for detecting and providing braking assessment information indicative of a particulate emission from a vehicle braking system involves determining, upon a braking event, one or more physical quantities related to the particulate emission caused by the braking event based on detection of at least one physical quantity detected from the one or more physical quantities performed by respective detection means provided in the vehicle. The method and device may also include calculating, by an algorithm or mathematical assessment model, stored and executable in a computer, at least one braking assessment index, based on the one or more determined physical quantities. The braking assessment index being representative of a particulate emission amount by the vehicle braking system upon the braking event, and providing a user with braking assessment infor-
(Continued)

mation related to the calculated braking assessment index, by a user interface.

22 Claims, 8 Drawing Sheets

(51) Int. Cl.
*B60T 17/22* (2006.01)
*G06F 30/27* (2020.01)
*H04W 4/40* (2018.01)
*B60K 35/28* (2024.01)
*B60K 35/81* (2024.01)
*F16D 66/00* (2006.01)
*G06F 111/10* (2020.01)

(52) U.S. Cl.
CPC .............. *B60K 35/28* (2024.01); *B60K 35/81* (2024.01); *B60K 2360/16* (2024.01); *B60K 2360/166* (2024.01); *B60T 2230/00* (2013.01); *B60T 2250/00* (2013.01); *B60T 2250/04* (2013.01); *B60T 2270/88* (2013.01); *F16D 2066/001* (2013.01); *G06F 2111/10* (2020.01)

(58) Field of Classification Search
CPC ...... H04W 4/40; G06F 30/27; G06F 2111/10; B60K 35/00; B60K 2370/16; B60K 2370/166; B60K 2370/52; F16D 2066/001
USPC .............. 188/1.11 E, 1.11 L, 1.11 R, 1.11 W
See application file for complete search history.

(56) References Cited

U.S. PATENT DOCUMENTS

| | | |
|---|---|---|
| 9,701,316 B2 | 7/2017 | Jelbert et al. |
| 2008/0236269 A1 | 10/2008 | Howell et al. |
| 2020/0150016 A1* | 5/2020 | Logovyy ................. B60T 17/22 |
| 2021/0199544 A1* | 7/2021 | Tsurumi ................. G01N 1/22 |

OTHER PUBLICATIONS

Jana Kukutschova et al., On airborne nano/micro-sized wear particles released from low-metallic automotive brakes, Environmental Pollution, Nov. 19, 2010, pp. 998-1006, vol. 159, Issue 4, Elsevier Ltd., Barking, https://www.sciencedirect.com/science/article/abs/pii/S0269749110005476?via%3Dihub.

* cited by examiner

METHOD AND DEVICE FOR DETECTING AND PROVIDING BRAKING ASSESSMENT INFORMATION, INDICATIVE OF A PARTICULATE EMISSION DUE TO THE USE OF A VEHICLE BRAKING SYSTEM

CROSS-REFERENCE TO RELATED APPLICATIONS

This application is a National Phase Application of PCT International Application No. PCT/IB2019/056716, having an International Filing Date of Aug. 7, 2019 which claims priority to Italian Application No. 102018000008055 filed Aug. 10, 2018, each of which is hereby incorporated by reference in its entirety.

FIELD OF THE INVENTION

The object of the present invention is a method for detecting and providing braking assessment information, indicative of a particulate emission due to the use of a vehicle braking system.

The object of the present invention is also a device for detecting and providing braking assessment information, indicative of a particulate emission due to the use of a vehicle braking system, capable of carrying out the aforesaid method.

BACKGROUND ART

For over two decades, the European Union (EU) and the World Health Organization (WHO) have been working to reduce particulate emissions (PM), providing both guidelines and legislation.

Among the fields in which the sources of particulate to be cut down are identified, there is the field of road transport.

In such field, it is possible to identify exhaust emissions due to exhaust gases, originating from engine combustion processes, and non-exhaust emissions, originating, for example, from brake wear and tire wear.

Exhaust gas emissions have been the subject of great attention for a long time.

Thereby, at least in the urban environment, a reduction trend is fortunately evident in many cities, by virtue of the increasingly strict regulations (EURO emission standards) which must be observed and implemented in vehicles the circulation of which is permitted.

On the contrary, non-exhaust emissions are not subject to equally stringent regulations, and, to date, they have been the object of a lesser attention.

As a result, it is estimated that today exhaust gas emissions and non-exhaust emissions equally contribute to pollution in urban environments.

In the light of this, the UNECE has defined the particle measurement program (PMP) aimed at standardizing non-exhaust emissions. Therefore, attention to non-exhaust emissions has recently increased significantly.

In particular, attention to vehicle braking systems, which are one of the main sources of non-exhaust emissions, has increased.

To reduce wear emissions of braking systems, as a whole, in addition to implementing design and structural improvements on braking systems, a very promising approach is to focus the attention on driving style and braking style. In fact, considering equal braking systems, particulate emissions vary considerably depending on the driving style and the way in which one brakes.

In particular, it has been verified that some parameters, such as, for example, braking pressure and speed, which are under the exclusive control of the drivers, considerably influence the particulate emission of the braking system.

Therefore, the option of having available methods to "teach" the driver how to brake correctly, so as to reduce emissions, based on the ability to provide the driver, even in real time while driving, with information with regard to the braking style and the consequent impact in terms of particulate emissions caused, would be desirable.

With regard to an automatic qualitative assessment of a "driving style" in a broad sense, based on quantitative detections, several solutions are known aimed at characterizing the driving style in terms of efficiency in reducing consumption or in reducing exhaust emissions.

On the contrary, no solutions are known aimed at characterizing driving style in terms of efficiency in reducing non-exhaust emissions, nor specifically aimed at making drivers aware of the braking behavior thereof, so as to reduce non-exhaust emissions due to the braking actions of the braking system.

Furthermore, the aforesaid known solutions (i.e., the solutions aimed at characterizing driving style in terms of efficiency in reducing exhaust emissions) are not at all applicable, and may not be transposed, to the context of the solutions considered herein, i.e., the solutions aimed at characterizing driving style in terms of efficiency in reducing non-exhaust emissions due to the braking system.

In light of the above, the need is strongly felt to have available methods and devices for detecting and providing braking assessment information, indicative of a particulate emission due to the use of a vehicle braking system, such to provide detailed information to the drivers, to allow the drivers to improve the braking style thereof so as to reduce non-exhaust emissions.

Solution

It is an object of the present invention to provide a method for detecting and providing braking assessment information, indicative of a particulate emission due to the use of a vehicle braking system, which allows to obviate at least partially the drawbacks complained here above with reference to the background art, and to fulfill the abovementioned requirements particularly felt in the technical sector considered.

This and other objects are achieved by a method for detecting and providing braking assessment information as described and claimed herein.

Some advantageous embodiments are also described.

It is also the object of the present invention to provide a device for detecting and providing braking assessment information, indicative of a particulate emission due to the use of a vehicle braking system, capable of performing the aforesaid method.

This and other objects are achieved by a device for detecting and providing braking assessment information as described and claimed herein.

BRIEF DESCRIPTION OF THE DRAWINGS

Further features and advantages of the method and the device in accordance with the invention will become apparent from the following description of preferred embodiments thereof, given by way of indication and not by way of limitation, with reference to the accompanying Figures, in which.

DETAILED DESCRIPTION OF THE INVENTION

With reference to FIGS. 1-8, a method for detecting and providing braking assessment information I, indicative of a particulate emission due to the use of a vehicle braking system, is described.

The method, first of all, comprises the step of determining, upon a braking event, one or more physical quantities (A, B, C) related to the vehicle particulate emission caused by the braking event, based on the detection of at least one physical quantity (A) detected from the aforesaid one or more physical quantities, performed by respective detection means 10 provided in the vehicle.

The method comprises then the step of calculating, by means of an algorithm or mathematical assessment model M1, stored and executable in a computer 12 provided in the vehicle, at least one braking assessment index ivf, based on the aforesaid one or more determined physical quantities (A, B, C). Such braking assessment index ivf is representative of a particulate emission amount QP due to the use of the vehicle braking system upon the braking event.

The method lastly includes providing a user with braking assessment information I related to the aforesaid calculated braking assessment index ivf, by means of a user interface 14.

In accordance with different possible embodiments of the method, the aforesaid one or more determined physical quantities (A, B, C) comprise one or more quantities belonging to the following group: vehicle speed (v), and/or vehicle acceleration/deceleration (a), and/or vehicle braking system temperature (T), and/or braking pressure (p), and/or vehicle engine torque (c), and/or braking torque, and/or vehicle inclination, and/or number and/or concentration of particles emitted by the vehicle braking system.

Also the aforesaid one or more detected physical quantities (A) comprise one or more quantities belonging to the following group: vehicle speed (v), and/or vehicle acceleration/deceleration (a), and/or vehicle braking system temperature (T), and/or braking pressure (p), and/or vehicle engine torque (c), and/or braking torque, and/or vehicle inclination, and/or number and/or concentration of particles emitted by the vehicle braking system.

Therefore, the method implies that a certain subset of the aforesaid physical quantities is identified as relevant for the calculation of the braking assessment index. Then, as implementation examples of the method, it is possible that all the physical quantities of such subset are directly detected, or that some of them, or even all of them, are estimated based on a second subset of detected physical quantities.

Figure 1:
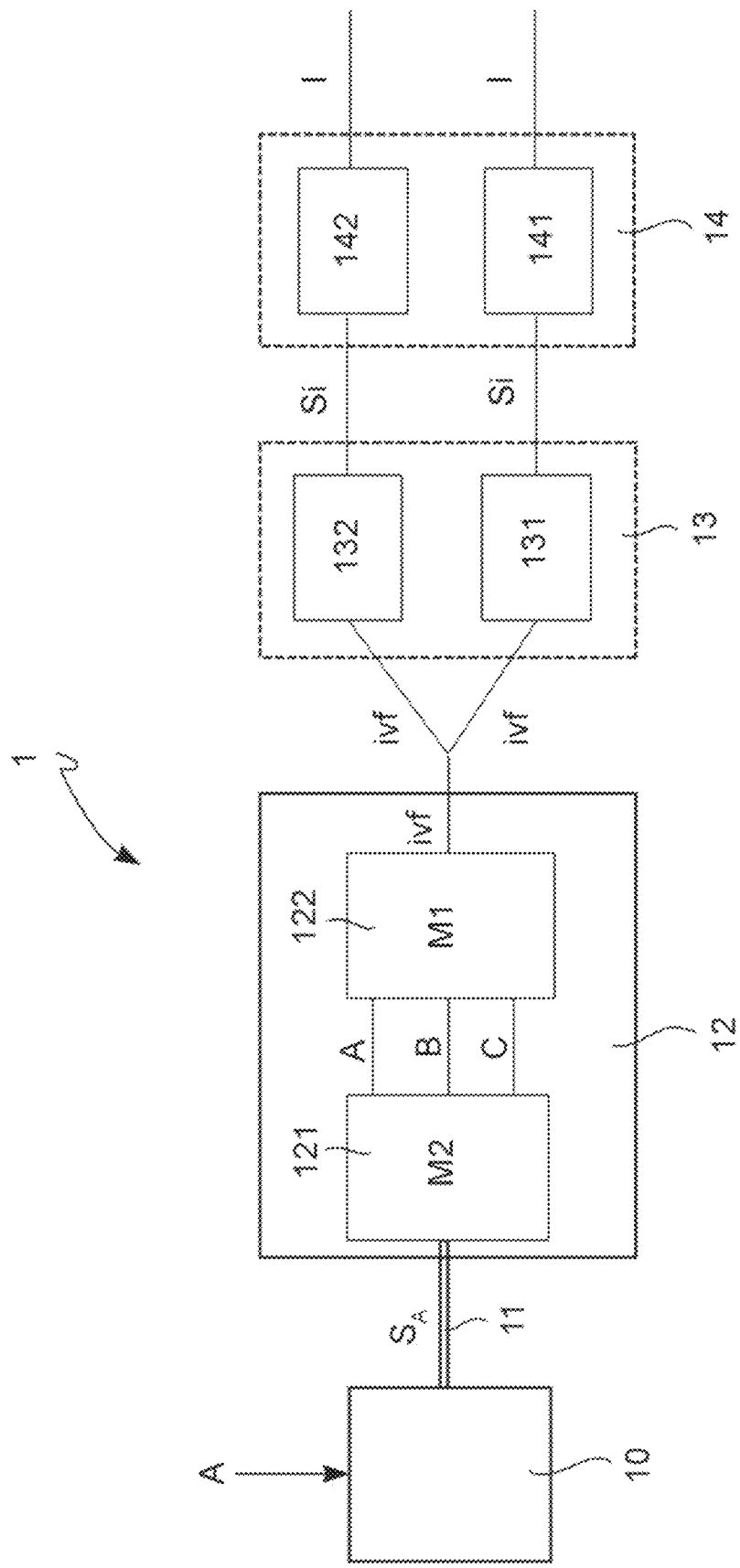
FIG. 1 shows a simplified block diagram of a device for detecting and providing braking assessment information, in accordance with an embodiment of the invention.

In the example shown in FIG. 1, a single quantity (or variable, or parameter) A is physically detected, and three quantities (or variables, or parameters) are determined, one directly from the detection (A) and the other two indirectly (B, C) by means of appropriate algorithms or mathematical models.

The person skilled in the art easily understands that the case shown in FIG. 1 is one of the many possible examples. In different implementation options of the method, the number of quantities detected is greater than one; or, the number of quantities determined is other than three. Furthermore, in different implementations of the method, the subset of detected quantities and the subset of determined quantities coincide, or are totally disjoint, or have an intersection.

Numerous combinations are therefore included in the method, relative to the use of the aforesaid quantities, and to the fact that they are physically detected or determined by means of calculations or models. In the following of this description, some particularly significant combinations will be exemplified.

In accordance with an embodiment of the method, the aforesaid determining step is performed by means of an algorithm or mathematical determination model M2, stored and executable in a computer 12 provided in the vehicle.

A plurality of algorithms or mathematical determination models M2, adapted to determine some physical quantities based on other detected physical quantities, may be used in the present method, depending on the detected quantities and the determined quantities. The algorithms or mathematical determination models M2 which may be employed may be known per se, or developed ad hoc. In the following of this description, some significant examples will be given.

A plurality of algorithms or mathematical assessment models M1, adapted to calculate the braking assessment index ivf, may be used in the present method, depending on the determined quantities on which the calculation is based. In the following of this description, some significant examples will be given.

As already noted above, the detection of one or more physical quantities is performed upon a braking event, and/or during the entire duration of a braking/braking event. All the embodiments given below refer to such detection condition.

According to an implementation example of the method, the determining step comprises detecting the vehicle speed v.

According to different implementation options, the speed v is detected by speed detection means and/or a speed sensor provided in the vehicle. For example, detection means existing on the vehicle to provide data to the speedometer may be used for this purpose. In accordance with another example, wheel sensors may be used, taking the average speed detected by the wheel sensors as the detected speed.

According to another implementation example of the method the determining step comprises estimating the vehicle speed v.

According to an implementation example of the method, the determining step comprises detecting the vehicle acceleration/deceleration a. This may be done, for example, by means of acceleration sensors present or installed on the vehicle for such purpose.

In accordance with another implementation example of the method the determining step comprises estimating the vehicle acceleration/deceleration a.

For the purposes of the present description, the terms "acceleration" or "acceleration/deceleration", and the corresponding reference "a", are used with the same meaning, i.e., they indicate the physical quantity "acceleration" taken with the sign thereof, where the positive sign indicates an increase in speed (acceleration) and the negative sign indicates a decrease in speed (deceleration). The deceleration case (acceleration with negative sign) is obviously the typical case which characterizes a braking event.

In accordance with a more specific implementation option, the speed v is detected by means of speed detection means, while the acceleration/deceleration a is estimated based on the aforesaid detected speed v.

For example, an initial speed vi (at the beginning of the braking action) and a final speed of (at the end of the braking action) may be detected, and an average deceleration may be estimated as the ratio between the difference between final speed and initial speed and the duration of the braking action.

In accordance with a more specific implementation option, the acceleration/deceleration a is detected by means of acceleration detection means, while the speed v is estimated based on the aforesaid detected acceleration/deceleration a.

In different implementation options, the speed and/or acceleration time trends throughout the entire braking time interval, and/or the average values and/or peak speed and/or acceleration values are acquired within the braking time interval.

In accordance with a preferred implementation option, the integral average along the braking time interval of the speed v and/or acceleration a is determined, from the acquired data, as the speed v and/or acceleration a, so as to obtain a more complete information about the entire braking event.

According to an implementation example of the method, the determining step comprises detecting the braking system temperature T.

According to an implementation example of the method, the determining step comprises estimating the braking system temperature T.

According to an implementation example of the method, the determining step comprises detecting the braking pressure p.

According to an implementation example of the method, the determining step comprises estimating the braking pressure p.

Figure 3:
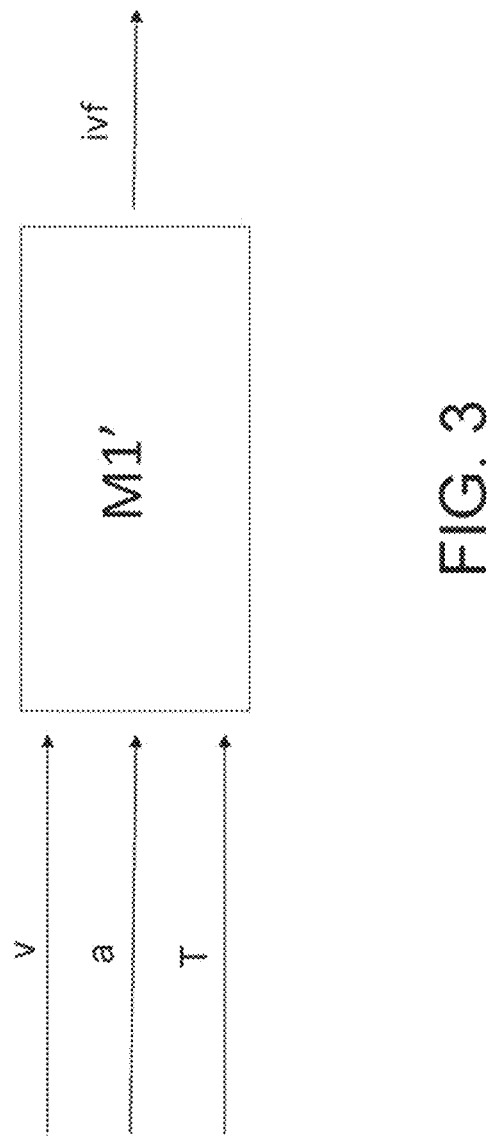
FIGS. 3 to 8 show, by means of block diagrams, the method for detecting and providing braking assessment information, or some steps thereof, in accordance with respective embodiments comprised in the invention.

In accordance with an embodiment of the method, shown in FIG. 3, the vehicle speed v, the vehicle acceleration/deceleration a, and the braking system temperature T are determined (detected or estimated). In such case, the calculating step comprises calculating the braking assessment index ivf based on the aforesaid vehicle speed v and acceleration/deceleration a and on the aforesaid braking system temperature T, as determined.

As shown in FIG. 3, the braking assessment index ivf is calculated by means of an algorithm or mathematical model M1'.

In accordance with a possible implementation option, the algorithm M' may be based on a non-linear function in the variables v, a, T, i.e., $f_1$ (v, a, T), for example, a polynomial function with coefficients obtained from tests or experiments.

In accordance with another possible implementation option, the algorithm M' may be based on a linear function in the variables v, a, T, of the type:

$$C_1 \cdot v + C_2 \cdot a + C_3 \cdot T$$

or based on a logarithmic function, with a linear argument in the variables v, a, T, of the type:

$$\log(C_1 \cdot v + C_2 \cdot a + C_3 \cdot T)$$

in which $C_1$, $C_2$ and $C_3$ are predetermined coefficients, for example, obtained and/or calibrated by means of tests or experiments.

Figure 4:
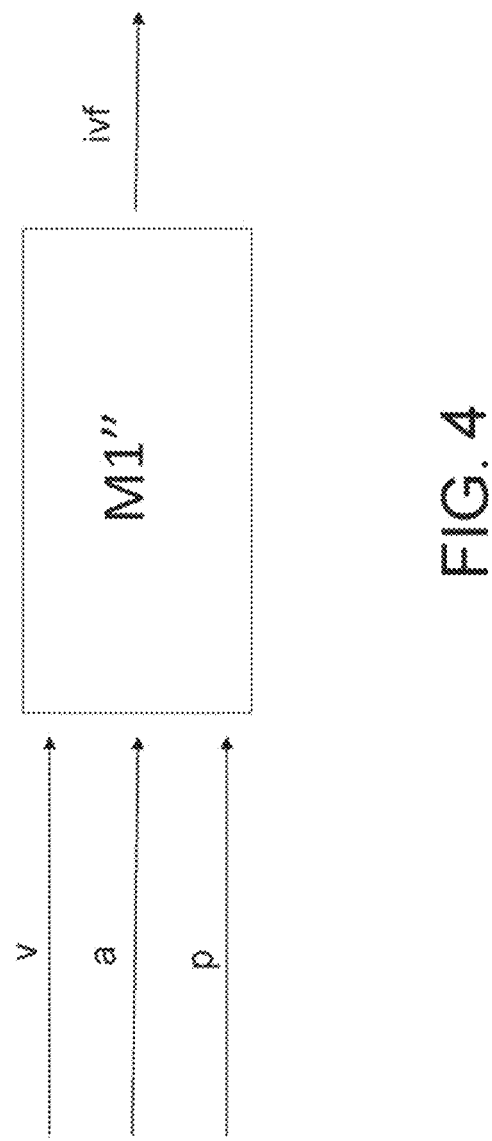

In accordance with an embodiment of the method, shown in FIG. 4, the vehicle speed v, the vehicle acceleration/deceleration a, and the braking pressure p are determined (detected or estimated). In such case, the calculating step comprises calculating the braking assessment index ivf based on the aforesaid vehicle speed v and acceleration/deceleration a and on the aforesaid braking pressure p, as determined.

As shown in FIG. 4, the braking assessment index ivf is calculated by means of an algorithm or mathematical model M1".

In accordance with a possible implementation, the algorithm M" may be based on a non-linear function in the variables v, a, p, that is, $f_2$ (v, a, p), for example, a polynomial function with coefficients obtained from tests or experiments.

In accordance with another possible implementation option, the algorithm M" may be based on a linear function in the variables v, a, p, of the type:

$$C_4 \cdot v + C_5 \cdot a + C_6 \cdot p$$

or based on a logarithmic function, with a linear argument in the variables v, a, p, of the type:

$$\log(C_4 \cdot v + C_5 \cdot a + C_6 \cdot T)$$

in which $C_4$, $C_5$ and $C_6$ are predetermined coefficients, for example, obtained and/or calibrated by means of tests or experiments.

Figure 5:
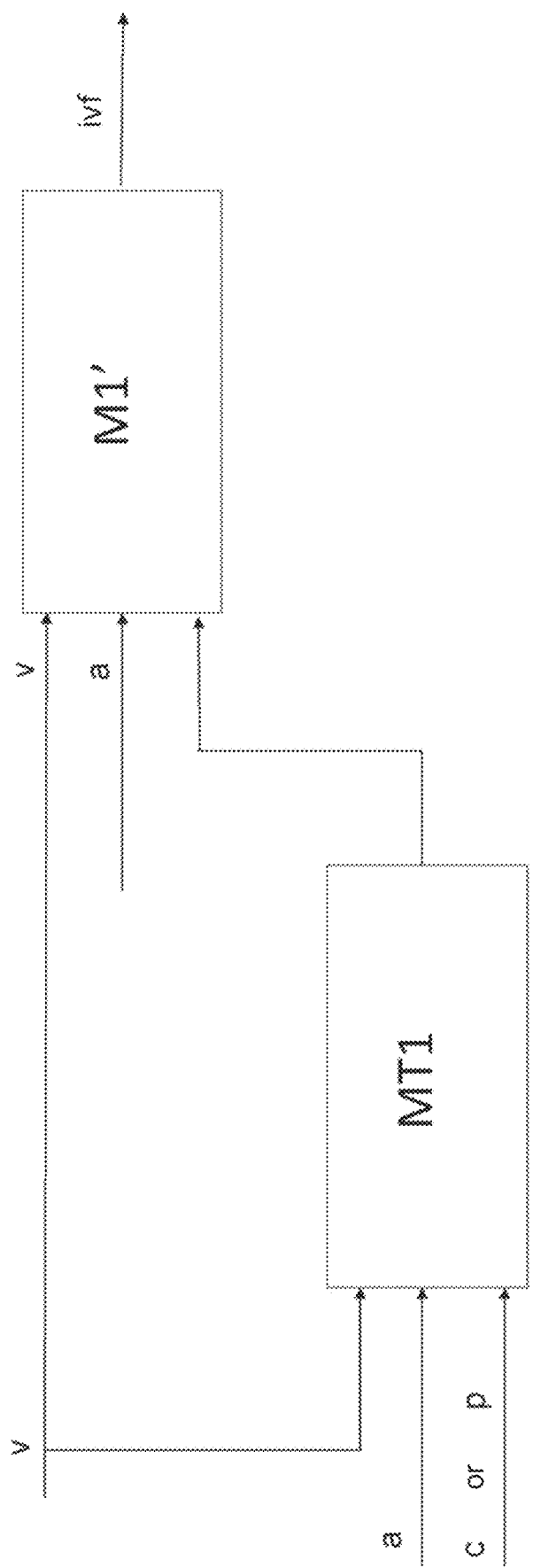

In accordance with a more specific implementation option of the aforesaid embodiment shown in FIG. 3, the braking system temperature T is estimated, as shown in FIG. 5.

In such case, the method comprises the further step of detecting the braking pressure p, by means of a respective sensor, or estimating the vehicle engine torque c, based on the detected or estimated acceleration/deceleration a. The step of determining the braking system temperature T comprises estimating the braking system temperature, based on the detected vehicle speed v and acceleration/deceleration a and based on the detected braking pressure p or on the estimated vehicle engine torque c, by means of a first predetermined braking system thermal model MT1 (indicated in more general terms as M2 in FIG. 1).

As a braking system thermal model, a thermal model per se known, for example, starting from the characterization of the braking system itself, may be used. In particular, for each type of vehicle and relative braking system, it may be appropriate to use a thermal model known a priori. Such thermal model may, for example, comprise a parametric function or equations linking the temperature differences generated as a function of the braking energy, given a heat exchange coefficient and an ambient temperature, the coefficients and/or parameters of which are defined starting from the knowledge and/or characterization of the vehicle and braking system.

In accordance with a particular implementation option, the method further comprises a road inclination detection, which is taken into account for the estimation of the vehicle engine torque.

In accordance with another embodiment of the method, shown in FIG. 6, the braking assessment index ivf is calculated as follows.

The determining step comprises: detecting or estimating an average vehicle acceleration/deceleration (am) during the braking event; determining an initial braking system temperature Ti, at the beginning of the braking event; determining a final braking system temperature Tf at the end of braking event.

The step of calculating the braking assessment index ivf comprises calculating the braking assessment index ivf as a polynomial having, as a variable, the difference between the aforesaid final temperature Tf and initial temperature Ti of the braking system, and coefficients depending on the aforesaid average acceleration/deceleration am and on the aforesaid initial temperature Ti according to predetermined relations.

In particular, according to a specific example, the braking assessment index ivf is calculated according to the formula:

$$ivf = \alpha X^2 + \beta X + \gamma$$

where X is the difference between the aforesaid final temperature Tf and initial temperature Ti; $\alpha$, $\beta$, $\gamma$ are coefficients depending on the average acceleration/deceleration am and on the initial temperature Ti.

In accordance with other possible examples, other polynomial formulas may be used, for example, based on a third or higher degree polynomial, with a consequent greater number of parameters, to take into account more marked non-linearity phenomena.

In an implementation option of this embodiment, the initial temperature Ti and the final temperature Tf are detected by means of a temperature sensor.

Figure 6:
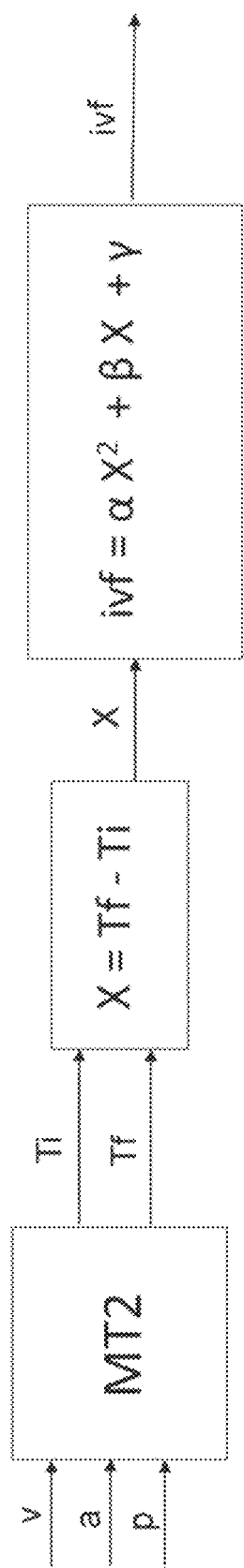

In another implementation option of this embodiment, as shown in FIG. 6, the steps of determining an initial temperature Ti and a final temperature Tf comprise estimating the initial temperature Ti and the final temperature Tf based on detected or estimated vehicle speed v and acceleration/deceleration a and based on a detected braking pressure p or a detected or estimated vehicle engine torque c, by means of a second predefined braking system thermal model MT2 (indicated, in more general terms, as M2 in FIG. 1).

As a braking system thermal model, a thermal model per se known, for example, starting from the characterization of the braking system itself, may be used. In particular, for each type of vehicle and relative braking system, it may be appropriate to use a thermal model known a priori. Such thermal model may, for example, comprise a parametric function or equations linking the temperature differences generated as a function of the braking energy, given a heat exchange coefficient and an ambient temperature, the coefficients and/or parameters of which are defined starting from the knowledge and/or characterization of the vehicle and braking system.

In the estimate, a system ambient temperature reference may be used, if available, for example originating from the vehicle.

It should be noted that, in accordance with an embodiment of the method, the aforesaid parameters and/or coefficients characterizing the functions and/or equations of the aforesaid algorithms or mathematical assessment models M1, M1', M1" (i.e., for example, in the different implementations described above, the coefficients of the aforesaid functions $f_1$ and/or $f_2$ and/or the aforesaid coefficients $C_1$, $C_2$, $C_3$ and/or $C_4$, $C_5$, $C_6$ and/or the aforesaid coefficients $\alpha$, $\beta$, $\gamma$) are obtained and/or calibrated by means of tests or experiments, so as to provide a braking assessment index ivf value which takes into account the particulate emitted by the entire braking system (and not only the particulate due to the wear of the pads).

In other words, the tests or experiments which are performed to obtain and/or calibrate the aforesaid coefficients and/or parameters are performed under conditions in which the entire braking system is stressed, and emits particulates both due to the wear of the pads and due to the stress of the discs and/or other parts of the braking system.

Thereby, the braking assessment index ivf represents the effect of the braking, in terms of particulate emission, in a more realistic manner with respect to methods aimed at indirectly estimating the particulate emitted based on a mere brake pads wear assessment.

Figure 7:
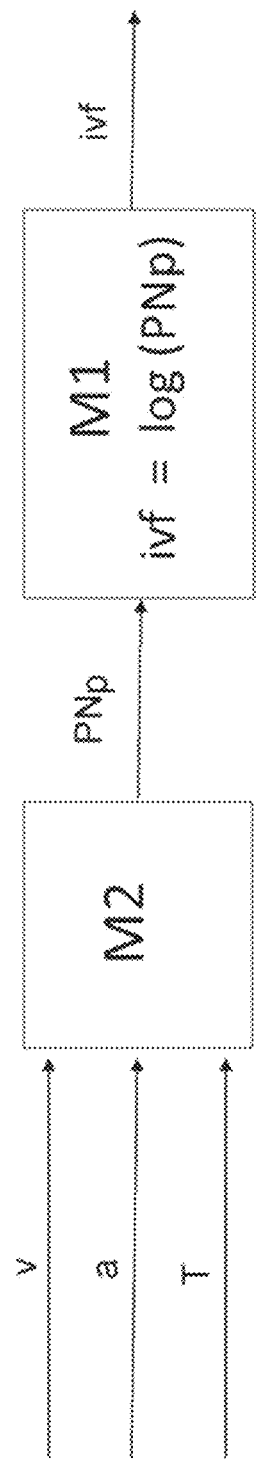

In accordance with an embodiment of the method, shown in FIG. 7, the braking assessment index ivf is a value bi-univocally related to the peak PNp of the number or amount of emitted particles PN on braking, in which the peak of the number or amount of emitted particles PNp upon braking is a function of the vehicle speed v and acceleration/deceleration a and of the braking system temperature T.

In a specific example, also shown in FIG. 7, the braking assessment index ivf is calculated as a logarithm of the peak of the number or amount of emitted particles PN upon the braking event.

Figure 8:
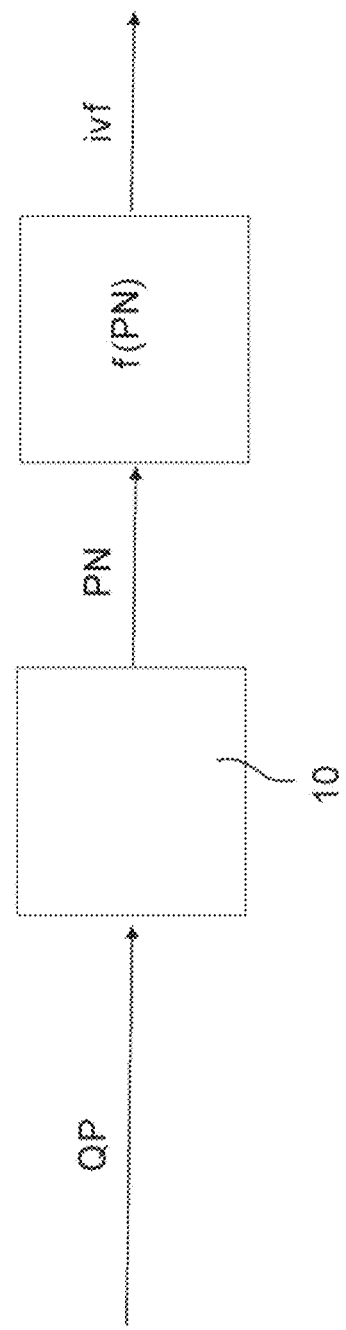

In accordance with an embodiment of the method, shown in FIG. 8, the braking assessment index ivf is a value related to the number or amount and/or concentration of emitted particles PN on braking.

In the example shown in FIG. 8, the number and/or concentration of particles PN emitted by the braking system upon braking is directly detected, by means of a sensor for detecting the emitted particles, by sampling the amount of emitted particulate QN. The braking assessment index ivf is calculated as a function of PN, for example, a logarithmic function.

In accordance with different possible implementation variants, as a basis for the calculation of the braking assessment index ivf, starting from the amount of particulate emitted, the cumulative number of particles in the braking interval, or the average number per unit of time, or the volumetric concentration of detected particles, or the volumetric concentration of detected particles per unit of time are used.

In accordance with a preferred implementation example, a sum/time integral of the number of particles emitted during the braking time interval is used.

In accordance with an implementation, the braking assessment index ivf is expressed and displayed on a scale, in relative terms with respect to a maximum emission value upon a braking event, theoretically and/or experimentally determined.

In particular, in accordance with an implementation, the braking assessment index ivf may be expressed, on a scale, for example, from 1 to 100.

As already previously observed and exemplified, the algorithm or mathematical assessment model M1, used in the calculation step, may comprise an algorithm capable of estimating the braking assessment index ivf based on one or more formulas having, as input variables, the aforesaid one or more determined physical quantities and comprising predetermined coefficients on the basis of experimentation or characterization procedures performed off-line.

In accordance with another embodiment, the algorithm or mathematical assessment model M1, used in the calculating step, comprises an automatic learning algorithm, trained by means of a training step performed off-line.

In such case, the automatic learning algorithm comprises, for example, an algorithm based on neural networks, or other types of trained algorithms (wavelet, fuzzy, and so on).

Furthermore, the algorithm or mathematical assessment model M1 may be adaptive, i.e., include parameters that are adjustable and/or variable as a function of feedback, deriving, for example, from the monitoring of external conditions.

With reference now to the step of providing information to the user, the method provides for transmitting to the user interface 14 a signal representative of the calculated braking assessment index ivf, and therefore displaying information I related to the braking assessment index ivf, by the user interface 14.

In accordance with an embodiment of the method, a plurality of braking assessment index ivf values are calculated on a plurality of braking events occurred during a travel.

In such case, the displaying step comprises, according to an implementation option, displaying information I1 representative of the numerical value of the braking assessment index for each braking event; in accordance with another implementation option, displaying information I2 representative of an average value of the braking assessment index related to a plurality of braking events; according to another implementation option, displaying information I3 related to a positive or intermediate or poor judgement of the braking event by means of a writing, or colored indicators, depending on whether the value of the braking assessment index is below a first threshold, or between the first and a second threshold, or above the second threshold; in accordance with another implementation option, displaying a travel map I4, indicating the braking points and, for each braking point, indicating the judgement of the respective braking event by means of colored indicators; according to another implementation option, displaying, for each braking event, the value of the detected or estimated physical quantities I5 based on which the braking assessment index ivf was calculated. In accordance with other implementation options, the displaying step comprises displaying any subset of, or even all, the aforesaid information (I1-I5).

In accordance with an implementation option, the displaying step comprises: displaying information (I1) representative of the numerical value of the braking assessment index for each braking event; and/or displaying information (I2) representative of an average value of the braking assessment index related to a plurality of braking events; and/or displaying information (I3) related to a positive or intermediate or poor judgement of the braking event by means of a writing, or colored indicators, depending on whether the value of the braking assessment index is below a first threshold, or between the first and a second threshold, or above the second threshold; and/or displaying a travel map (I4), indicating the braking points and, for each braking point, indicating the judgement of the respective braking event by means of colored indicators.

Figure 2:
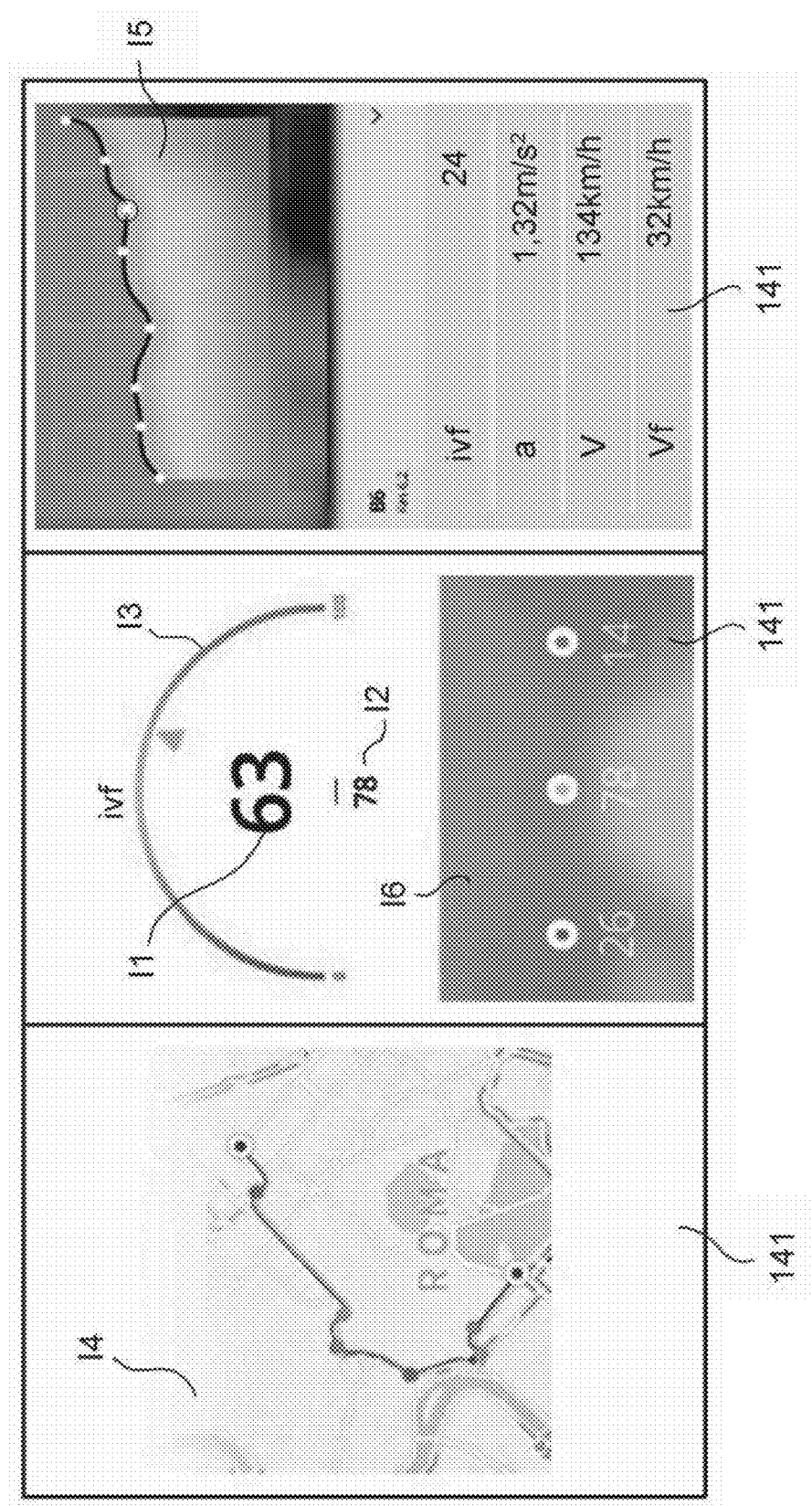
FIG. 2 shows some examples of user interface, comprised in the device, and of information display to the user, as provided in some embodiments of the method in accordance with the invention.

In the example of FIG. 2, the braking assessment index is expressed (according to one of the possibilities previously shown) on a scale, for example, from 1 to 100, in relative terms with respect to a maximum emission value. The indicated value (63) therefore corresponds to 63% of the maximum emission. The average value is, in the example of FIG. 2, 78. The indicator on the scale I3 shows that the judgement on the braking event is "intermediate", since, in the example shown, the first threshold corresponds to 33 and the second threshold corresponds to 66.

In the example of FIG. 2, it is further shown a counter (I6) of the cumulative number of braking events (for example, during a travel) which have had a positive, intermediate, poor judgement.

The displaying step may further comprise displaying, for each braking event, the value of the detected or estimated physical quantities (reference I5 in FIG. 2), based on which the braking assessment index ivf was calculated.

In accordance with an embodiment of the method, the user is the driver or pilot of the vehicle; the transmitting step comprises transmitting the signal representative of the braking assessment index by means of a vehicle communication infrastructure 131; the displaying step comprises displaying the information I on indicators or displays 141 provided in the vehicle dashboard.

In accordance with another embodiment of the method, the transmitting step comprises transmitting the signal representative of the braking assessment index by means of a wireless communication infrastructure 132 to a mobile user device 142; the displaying step comprises displaying the information I on the mobile user device 142.

In both the embodiments illustrated in the paragraphs just above, the types of displays may be the most varied (alternatively to the explanatory ones shown in FIG. 2), comprising numerical display or bar display, control lights with different color codes, etc.

In accordance with an embodiment of the method, the aforesaid one or more detected physical quantities A comprise the number and/or concentration of particles emitted by the braking system.

In such case, the aforesaid step of calculating at least one braking assessment index ivf comprises calculating the at least one braking assessment index ivf on the basis of the number detected and/or of the detected concentration of the particles emitted by the braking system.

With reference to FIG. 1, a device 1 for detecting and providing braking assessment information, indicative of a particulate emission due to the use of a vehicle braking system, comprised in the present invention, is now described.

The device 1 comprises detection means 10, provided in the vehicle, a first communication infrastructure 11, provided in the vehicle, a computer 12, provided in the vehicle, a second communication infrastructure 13 and a user interface 14.

The detection means 10 are configured to detect, upon a braking event, one or more detectable physical quantities A related to the particulate emission by the vehicle caused by the braking event.

The first communication infrastructure 11 is configured to transmit first signals $S_A$ representative of said one or more identifiable physical quantities A.

The computer 12 is connected to the first communication infrastructure 11 to receive the aforesaid first signals $S_A$, and configured to determine, based on such first signals $S_A$, by means of an algorithm or mathematical assessment model M1 stored therein, one or more physical quantities (A, B, C) related to the vehicle particulate emission caused by the braking event.

The computer 12 is further configured to calculate, by means of an algorithm or mathematical determination model M2 stored therein, based on said one or more determined physical quantities (A, B, C) at least one braking assessment index ivf, representative of a particulate emission amount QP due to the use of the vehicle braking system on braking.

The second communication infrastructure 13 is configured to transmit a second signal $S_i$ representative of the calculated braking assessment index ivf.

The user interface 14 is connected to the second communication infrastructure 13 to receive the aforesaid second signal $S_i$, and is configured to obtain the braking assessment index ivf from such second signal $S_i$ and provide a user with information I related to such braking assessment index ivf.

In accordance with different embodiments of the device 1, the aforesaid detection means 10 comprise one or more sensors belonging to one or more of the following types: vehicle speed sensors; and/or vehicle acceleration/deceleration sensors; and/or braking system temperature sensors; and/or braking pressure sensors, which braking pressure is caused by the braking action of the driver; and/or vehicle engine torque sensors; and/or vehicle inclination sensors; and/or particle number and/or concentration sensors, for the particles emitted by the braking system.

In accordance with an embodiment of the device 1, the computer 12 comprises one or more processors or computers present in any control unit of the vehicle.

The computer contains, stored, the algorithm or mathematical assessment model M1 and the algorithm or mathematical determination model M2, and is capable performing such algorithms or mathematical models. Further information with regard to the algorithm or mathematical assessment model M1 and the algorithm or mathematical assessment model M2 have been previously provided in the description of the method in accordance with the invention.

Such algorithms may be executed by one or more software programs or modules, for example, by the two software modules diagrammatically indicated with references 121 and 122 in FIG. 1.

In accordance with an embodiment of the device 1, the first communication infrastructure 11 comprises a communication bus present in the vehicle (or vehicle bus), to which the sensor/s 10 and the computer 12 are connected, so as to use such vehicle bus for transmitting the aforesaid first signals $S_A$ representative of the one or more detected physical quantities A by means of a communication protocol which is suitable for the vehicle bus.

In accordance with an implementation option of the device 1, the user interface 14 comprises one or more indicators or displays 141 provided in the vehicle dashboard.

In accordance with an embodiment of the device 1, the second communication infrastructure 13 comprises a communication bus present in the vehicle (or vehicle bus) 131, to which the computer 12 and the user interface 14 are connected, so as to use such vehicle bus 131 for transmitting, to the user interface 14, the aforesaid second signal $S_i$ representative of the braking assessment index ivf, by means of a communication protocol which is suitable for the vehicle bus.

In accordance with different possible implementation options, the aforesaid vehicle bus 131 is a bus of the CAN type, either of the Flex ray type or of the Ethernet type.

In accordance with another embodiment of the device 1, the second communication infrastructure 13 comprises a wireless infrastructure 132 configured to transmit said second signal $S_i$ representative of the braking assessment index ivf from the computer 12 to a mobile user device 142.

In accordance with different possible implementation options, the aforesaid wireless infrastructure 132 comprises a wireless system of the Bluetooth BT or Bluetooth Low Energy BLE or WiFi or NFC type, provided in the vehicle.

In the example shown in FIG. 1, both embodiments described above, with reference to the second communication infrastructure (131 and 132), are present in parallel.

In other possible implementation options, only the second communication infrastructure based on the vehicle bus is present, or only the second wireless communication infrastructure is present.

In different possible embodiments, the device 1 is configured to carry out a method in accordance with any one of the embodiments of the method described above.

In accordance with an embodiment of the device 1, the aforesaid detection means 10 comprise one or more particle number and/or concentration sensors, configured to detect the number and/or concentration of particles emitted by the braking system.

In such case, the aforesaid computer 12 is configured to calculate the braking assessment index ivf based on the number and/or concentration of the particles emitted by the braking system, directly detected by the aforesaid one or more particle number and/or concentration sensors.

Some further details about the architecture of the proposed solution are provided below, by way of explanation and not by way of limitation.

As already noted above, from an architectural point of view the proposed solution is based on three levels:
- a measurement level, in which significant inputs are acquired by means of appropriate sensors;
- a processing level, in which the signals are acquired and processed;
- an interface level, to communicate the results of the braking style to the end user in real time and/or off-line.

To acquire data, at the measurement level, it is preferable to use sensors which are built-in or already present on the vehicle, such as pressure sensors, GPS coordinate sensors, speed sensors, etc.

If the required signals are not standard, for example, the braking system temperature, it is possible to incorporate special temperature transducers into the vehicle, or to use a software model, present in the control unit, which simulates the temperature sensor and/or estimates the temperature based on other data.

The measurements obtained are usually communicated at the processing level by means of a CAN communication protocol or other types of communication (Analog, PWM, SENT, etc.). At the processing level, a control unit collects the data required for assessing the braking style and analyzes them by means of appropriate software. The results may therefore be sent back to the vehicle, for example by means of CAN, so that the results may be communicated to the user.

There may be different methods of communication towards the interface level.

For example, the processed data intended for the user may pass again through the CAN communication protocol, making the information available to the on-board computers and digital dashboards. Therefore, a wireless data transfer (Bluetooth, Wi-Fi, etc.) may be employed to communicate the results to a mobile interface (for example, mobile phone, tablet, laptop), or even physical channels, such as LEDs, PWM or analogue signals, with vehicle dashboard display.

With regard to the method, an important point is the definition and calculation of the braking assessment index. In this regard, examples of such calculation have been previously provided.

In general, a first step consists in defining relations between the working conditions of the braking system and the emission of particles; a second step consists in selecting a group of physical quantities which is relevant for particulate emission (on the basis, for example, of experimental data, and taking into account, on the other hand, how easy it is to measure or estimate such quantities on the vehicle); a third step consists in identifying and refining an algorithm having as input the aforesaid quantities and as output the braking assessment index.

The above steps may be based on or corroborated by experimentation and/or characterization performed on specific experimentation benches.

In all cases, the method according to the invention provides an indicator which is concise and may be easily read by the user.

As can be seen, the object of the present invention is fully achieved by the method and device shown above, by virtue of the functional and structural features thereof.

In fact, the technical solutions previously described enable a significant, concise and easy-to-read feedback (the braking assessment index) to be provided with regard to the driving style, with specific reference to the braking manner and style, and to the consequent impact in terms of non-exhaust emissions.

Furthermore, as shown above, the braking assessment index ivf is calculated so as to represent the braking effect of the entire braking system in terms of particulate emission in the most realistic manner possible (with obvious advantages with respect to an assessment carried out based on a mere estimate of brake pads wear only).

Furthermore, the aforesaid information may be presented by means of two different communication methods: real-time indications (for example, directly on the vehicle dashboard), and off-line assessment, by means of any multimedia device, such as, for example, the car dashboard, or a user device (mobile phone, tablet, personal computer).

Thereby, users may ultimately be guided and educated to improve the braking style thereof, with great benefit in terms of reducing non-exhaust emissions due to the braking system.

The various embodiments shown above also allow further advantages to be pursued, such as the simplicity of installation on the vehicle (minimizing the number of physical components to be added, for example, by means of suitable models for estimating quantities which are not easily detected directly) and the effectiveness of the user interface, which provides drivers with clear and easily readable information, without any disturbance while driving.

A person skilled in the art, in order to satisfy contingent and specific needs, may modify, adapt and replace numerous elements of the embodiments described above with other functionally equivalent, without however departing from the scope of the following claims. Each of the features described as belonging to a possible embodiment may be achieved independently from the other embodiments described.

The invention claimed is:

1. A method for detecting and providing braking assessment information, indicative of a particulate emission from a vehicle braking system, the method comprising the following steps:
   upon a braking event, determining one or more physical quantities related to the particulate emission caused by the braking event, based on detection of at least one detectable physical quantity among said one or more physical quantities, performed by respective detection means provided in a vehicle;
   calculating, by an algorithm or mathematical assessment model stored and executable in a computer provided in the vehicle, at least one braking assessment index, wherein the calculation is based on said one or more determined physical quantities as input quantities for the calculation, said braking assessment index being representative of a particulate emission amount from the vehicle braking system upon the braking event; and
   providing a user with braking assessment information related to said calculated braking assessment index, by a user interface, wherein said step of providing a user with braking assessment information comprises:
   transmitting a signal representative of the calculated braking assessment index to the user interface; and
   displaying information related to the calculated braking assessment index by the user interface,
   wherein said transmitting step comprises transmitting the signal representative of the calculated braking assessment index by a vehicle communication infrastructure, and said displaying step comprises displaying the information on indicators or displays provided in a vehicle dashboard,
   or wherein said transmitting step comprises transmitting the signal representative of the calculated braking assessment index by a wireless communication infrastructure to a mobile user device, and said displaying step comprises displaying the information on the mobile user device.

2. The method according to claim 1, wherein:
   said one or more determined physical quantities comprise one or more quantities selected from the group consisting of: vehicle speed, vehicle acceleration/deceleration, vehicle braking system temperature, braking pressure, vehicle engine torque, braking torque, vehicle inclination, and number and/or concentration of particles emitted by the vehicle braking system;
   and wherein said at least one detectable physical quantity comprises one or more quantities selected from the group consisting of: vehicle speed, vehicle acceleration/deceleration, vehicle braking system temperature, braking pressure, vehicle engine torque, braking torque, vehicle inclination, and number and/or concentration of particles emitted by the vehicle braking system.

3. The method according to claim 2, wherein the determining step comprises:
   detecting or estimating the vehicle speed, and/or
   detecting or estimating the vehicle acceleration/deceleration, and/or
   detecting or estimating the vehicle braking system temperature, and/or
   detecting or estimating the braking pressure.

4. The method according to claim 3, wherein:
   the vehicle speed is detected by speed detection means and/or a speed sensor provided in the vehicle; and
   the vehicle acceleration/deceleration is estimated on the basis of said detected vehicle speed,
   or wherein:
   the vehicle acceleration/deceleration is detected by acceleration means and/or an acceleration sensor provided in the vehicle; and
   the vehicle speed is estimated on the basis of said detected vehicle accele-ration/deceleration.

5. The method according to claim 3, wherein the calculating step comprises: calculating the at least one braking assessment index based on said determined vehicle speed and acceleration/deceleration, and on said determined vehicle braking system temperature,
   or based on said determined vehicle speed and acceleration/deceleration, and on said determined braking pressure.

6. The method according to claim 2, wherein the determining step comprises:
   detecting or estimating an average vehicle acceleration/deceleration during braking;
   determining an initial braking system temperature, at the beginning of braking;

determining a final braking system temperature at the end of braking;

and wherein the step of calculating at least one braking assessment index comprises calculating the braking assessment index as a polynomial having, as a variable, the difference between said final braking system temperature and said initial braking system temperature, and coefficients depending on said average vehicle acceleration/deceleration and said initial braking system temperature according to predetermined relations.

7. The method according to claim 6, wherein the steps of determining a vehicle braking system temperature or an initial braking system temperature or a final braking system temperature comprise:

detecting said vehicle braking system temperature or initial braking system temperature or final braking system temperature by one or more temperature sensors; or estimating said vehicle braking system temperature or initial braking system temperature or final braking system temperature based on the detected or estimated vehicle speed and acceleration/deceleration, and based on a detected braking pressure and/or an engine torque of the vehicle detected or estimated by a predetermined thermal model of the braking system.

8. The method according to claim 2, wherein the detecting step comprises detecting the number and/or concentration of particles emitted by the braking system upon braking by a sensor for detecting the emitted particles, and wherein the calculating step comprises calculating the at least one braking assessment index based on said number and/or concentration of emitted particles.

9. The method according to claim 1, wherein a plurality of braking assessment index values is calculated on a plurality of braking events occurred during traveling, and wherein the displaying step comprises:

displaying information representative of the numerical value of the braking assessment index for each braking event; and/or displaying information representative of an average value of the braking assessment index related to a plurality of braking events; and/or displaying information related to a positive or intermediate or poor judgement of braking by means of a writing, or colored indicators, depending on whether the value of the braking assessment index is below a first threshold, or between the first and a second threshold, or above the second threshold; and/or displaying a travel map, indicating braking points and, for each braking point, indicating the judgement of a respective braking event by colored indicators, and/or for each braking event, displaying the value of the detected or estimated physical quantities based on which the braking assessment index was calculated.

10. The method according to claim 9, wherein the displaying step comprises displaying information representative of the numerical value of the braking assessment index for each braking event.

11. The method according to claim 9, wherein the displaying step comprises displaying information representative of an average value of the braking assessment index related to a plurality of braking events.

12. The method according to claim 9, wherein the displaying step comprises displaying information related to a positive or intermediate or poor judgement of the braking event by means of a writing, or colored indicators, depending on whether the value of the braking assessment index is below a first threshold, or between the first and a second threshold, or above the second threshold.

13. The method according to claim 9, wherein the displaying step comprises displaying a travel map, indicating braking points and, for each braking point, indicating the judgement of a respective braking event by colored indicators.

14. The method according to claim 9, wherein the displaying step comprises, for each braking event, displaying the value of the detected or estimated physical quantities based on which the braking assessment index was calculated.

15. The method according to claim 1, wherein the determining step is performed by an algorithm or mathematical determination model, stored and executable in the computer provided in the vehicle.

16. The method according to claim 1, wherein said braking assessment index is a value related by a biunivocal relationship to a peak of the number or amount of emitted particles on braking, and wherein the peak of the number or amount of emitted particles on braking is a function of the vehicle speed and acceleration/deceleration, and of the vehicle braking system temperature.

17. The method according to claim 1, wherein the algorithm or mathematical assessment model used in the calculating step comprises:

an algorithm capable of estimating the braking assessment index based on one or more formulas having, as input variables, said one or more determined physical quantities and based on predetermined coefficients on the basis of experimentation or characterization procedures performed off-line; or an automatic learning algorithm, trained by a training step performed off-line.

18. The method according to claim 1, wherein the braking assessment index is expressed and displayed on a scale normalized to a maximum emission value upon a braking event, theoretically and/or experimentally determined.

19. The method according to claim 1, wherein said at least one detectable physical quantity comprises the number and/or concentration of particles emitted by the braking system, and wherein said step of calculating at least one braking assessment index comprises calculating the at least one braking assessment index on the basis of the detected number and/or detected concentration of the particles emitted by the braking system.

20. A device for detecting and providing braking assessment information, indicative of a particulate emission from a vehicle braking system, the device comprising:

detection means provided in a vehicle, configured to detect, upon a braking event, at least one detectable physical quantity related to the particulate emission caused by the braking event;

a first communication infrastructure, provided in the vehicle, configured to transmit first signals representative of said at least one detectable physical quantity;

a computer provided in the vehicle, connected to said first communication infrastructure for receiving said first signals, and configured to determine, based on said first signals, by an algorithm or mathematical assessment model stored therein, one or more physical quantities related to the particulate emission caused by the braking event, and to calculate, by an algorithm or mathematical determination model stored therein, based on said one or more determined physical quantities, at least one braking assessment index, representative of a particulate emission quantity from the vehicle braking system upon the braking event;

a second communication infrastructure, configured to transmit a second signal representative of the calculated braking assessment index; and a user interface connected to said second communication infrastructure for receiving said second signal, and configured to obtain the braking assessment index from said second signal and provide a user with information related to said braking assessment index.

21. The device according to claim 20, wherein:

said detection means comprise one or more sensors selected from the group consisting of: vehicle speed sensors, vehicle acceleration/deceleration sensors, braking system temperature sensors, braking pressure sensors, which braking pressure is caused by a braking action of a driver, vehicle engine torque sensors, vehicle inclination sensors, and particle number and/or concentration sensors, for particles emitted by the braking system;

the computer comprises one or more processors or computers present in any control unit of the vehicle;

the first communication infrastructure comprises a vehicle bus, the sensors means and the computer being connected to the vehicle bus to use said vehicle bus for transmitting said first signals representative of the at least one detected identifiable physical quantity by a communication protocol suitable for the vehicle bus;

the user interface comprises one or more indicators or displays provided in a vehicle dashboard and/or displayable in a mobile user device;

the second communication infrastructure comprises a vehicle bus, the computer and the user interface being connected to said vehicle bus to use said vehicle bus for transmitting to the user interface said second signal representative of the braking assessment index by a communication protocol suitable for the vehicle bus, or the second communication infrastructure comprises a wireless infrastructure configured to transmit said second signal representative of the braking assessment index from the computer to the mobile user device.

22. The device according to claim 20, wherein said detection means comprise one or more particle number and/or concentration sensors configured to detect the number and/or concentration of particles emitted by the braking system, and wherein said computer is configured to calculate the braking assessment index on the basis of the number and/or of the concentration of the particles emitted by the braking system, detected by said one or more particle number and/or concentration sensors.

* * * * *